United States Patent
Sekita et al.

(10) Patent No.: US 11,401,908 B2
(45) Date of Patent: Aug. 2, 2022

(54) IGNITION CONTROL APPARATUS FOR INTERNAL COMBUSTION ENGINE AND CONTROL SYSTEM FOR INTERNAL COMBUSTION ENGINE

(71) Applicants: Mahle International GmbH, Stuttgart (DE); MAHLE Electric Drives Japan Corporation, Shizuoka (JP)

(72) Inventors: Tomoaki Sekita, Shizuoka (JP); Yuki Wakazuki, Shizuoka (JP)

(73) Assignees: MAHLE INTERNATIONAL GMBH; MAHLE ELECTRIC DRIVES JAPAN CORPORATION

( * ) Notice: Subject to any disclaimer, the term of this patent is extended or adjusted under 35 U.S.C. 154(b) by 0 days.

(21) Appl. No.: 17/106,070

(22) Filed: Nov. 28, 2020

(65) Prior Publication Data
US 2021/0164432 A1    Jun. 3, 2021

(30) Foreign Application Priority Data
Nov. 29, 2019  (JP) .............................. JP2019-216924

(51) Int. Cl.
| F02P 5/15 | (2006.01) |
| F02P 1/08 | (2006.01) |
| F02D 41/34 | (2006.01) |
| F02D 41/00 | (2006.01) |
| F02D 41/02 | (2006.01) |

(Continued)

(52) U.S. Cl.
CPC ................... *F02P 5/15* (2013.01); *F02P 1/08* (2013.01); *F02P 1/086* (2013.01); *F02P 5/1506* (2013.01);
(Continued)

(58) Field of Classification Search
CPC ........ F02D 45/00; F02D 41/009; F02D 41/02; F02D 41/34; F02D 43/00;
(Continued)

(56) References Cited

U.S. PATENT DOCUMENTS 3,809,043 A * 5/1974 Nagasawa ............... F02P 1/086
                                                                123/599
4,461,257 A * 7/1984 Hosaka ................. F02P 5/1521
                                                                123/406.24

(Continued)

FOREIGN PATENT DOCUMENTS

JP     H8-144915 A     6/1996

OTHER PUBLICATIONS

English abstract for JP-H8-144915.

*Primary Examiner* — Phutthiwat Wongwian
*Assistant Examiner* — Susan E Scharpf
(74) *Attorney, Agent, or Firm* — Fishman Stewart PLLC (57) ABSTRACT

An ignition control apparatus, e.g., for an internal combustion engine, includes a rotational speed calculation unit that calculates a rotational speed of an alternating current generator. A rotor of the alternating current generator is driven to rotate in synchronization with reciprocating motion of a piston of the internal combustion engine. An ignition timing determination unit determines an ignition timing of the internal combustion engine based on the rotational speed calculated by the rotational speed calculation unit. An ignition control unit supplies electric power to an ignition coil such that the internal combustion engine is ignited at the timing determined by the ignition timing determination unit.

13 Claims, 4 Drawing Sheets

(51) Int. Cl.
  *F02D 43/00* (2006.01)
  *F02P 7/067* (2006.01)
  *F02D 45/00* (2006.01)
(52) U.S. Cl.
  CPC .......... *F02P 7/0675* (2013.01); *F02D 41/009* (2013.01); *F02D 41/02* (2013.01); *F02D 41/34* (2013.01); *F02D 43/00* (2013.01); *F02D 45/00* (2013.01); *F02D 2200/101* (2013.01); *F02D 2200/1015* (2013.01); *F02N 2250/02* (2013.01); *Y02T 10/40* (2013.01)
(58) Field of Classification Search
  CPC ....... F02D 2200/101; F02D 2200/1015; F02D 2250/24; F02P 5/15; F02P 1/086
  See application file for complete search history.

(56) References Cited

U.S. PATENT DOCUMENTS

| | | | | |
|---|---|---|---|---|
| 5,906,651 | A * | 5/1999 | Amano | G01M 15/11 701/110 |
| 6,474,273 | B1 * | 11/2002 | Kinoshita | F01L 13/02 123/41 E |
| 8,136,390 | B2 * | 3/2012 | Arakawa | G01M 15/11 73/114.03 |
| 2001/0042542 | A1 * | 11/2001 | Sato | F02P 5/1506 123/599 |
| 2002/0038652 | A1 * | 4/2002 | Uemura | F02D 41/062 123/480 |
| 2002/0189588 | A1 * | 12/2002 | Umemoto | F02P 5/1504 123/406.47 |
| 2003/0056755 | A1 * | 3/2003 | Kiessling | F02P 3/0861 123/406.24 |
| 2003/0089336 | A1 * | 5/2003 | Kiessling | F02P 1/086 123/406.57 |
| 2004/0233590 | A1 * | 11/2004 | Nakagawa | H02M 5/458 361/18 |
| 2006/0103239 | A1 * | 5/2006 | Kishibata | F02D 41/0205 307/10.1 |
| 2016/0102616 | A1 * | 4/2016 | McConville | F02D 41/0087 123/334 |
| 2017/0037800 | A1 * | 2/2017 | Sugimoto | F02D 41/0225 |
| 2018/0051645 | A1 * | 2/2018 | Mikawa | F02D 13/0238 |

* cited by examiner

IGNITION CONTROL APPARATUS FOR INTERNAL COMBUSTION ENGINE AND CONTROL SYSTEM FOR INTERNAL COMBUSTION ENGINE

CROSS-REFERENCE TO RELATED APPLICATION

This application claims priority to Japanese Application No. 2019-216924 filed on Nov. 29, 2019, the contents of which are hereby incorporated by reference in its entirety.

TECHNICAL FIELD

The present invention relates to an ignition control apparatus for internal combustion engine.

BACKGROUND

Patent Literature 1 proposes, in a contactless ignition apparatus for internal combustion engine, a contactless ignition control apparatus for internal combustion engine that reliably detects phases of a three-phase generator by an output corresponding to only one of the phases and a timing sensor signal to cause reversed misfire.

In the contactless ignition apparatus for internal combustion engine, an ignition operation has been performed according to an ignition signal Vf. The ignition operation is permitted only when a comparison output Vc obtained by comparing a voltage Vb of a capacitor 18 charged by an alternating current output Va of a one-phase output terminal a of the three-phase generator with a setting value Vr of a predetermined voltage is at an H level. By this configuration, the ignition operation based on the ignition signal Vf is not performed (causes misfire) when an engine reversely rotates. It has been proposed that the comparison output Vc is appropriately adjusted by correcting the setting value Vr depending on the alternating current output waveform Va to reliably cause misfire when the engine reversely rotates.

PATENT LITERATURE

[Patent Literature 1] Japanese Patent Laid-Open No. 8-144915

SUMMARY

As an ignition control apparatus for internal combustion engine in recent years, an ignition control apparatus for internal combustion engine that controls an ignition timing (a timing at which ignition is performed) using a microcomputer loaded into an ECU has spread. To control the ignition timing using the microcomputer, a reciprocating speed of a piston of an internal combustion engine (here, also referred to as a rotational speed of an engine) needs to be correctly known. A normal engine is loaded with a battery. Thus, the microcomputer is started up from a time point where a main switch or a key switch is turned on before the engine is rotated by a starter so that the rotational speed of the engine can be instantly calculated and ignition control can also be performed.

On the other hand, in an agricultural machine, a generator, or the like, a so-called battery-less engine that is not loaded with a battery has also spread. In the battery-less engine, startup of the engine, which has usually been performed by a starter, needs to be performed by human power. For example, a recoil-start, a kick-start, and the like have been known as engine startup means by human power.

However, in the battery-less engine, a microcomputer is started up after the engine has rotated by some amount since cranking of the engine was started. If the microcomputer is not started up, an ignition timing of an internal combustion engine cannot be controlled. Thus, it can be said to be difficult for the engine to rotate by ignition of the internal combustion engine at an appropriate ignition timing. When the ignition timing is somewhat earlier than the appropriate ignition timing, the engine may reversely rotate (a kickback occurs). Accordingly, it can be said that in the battery-less engine, the engine may easily reversely rotate immediately after the engine is started up.

The present invention has been made in view of the above-described problems, and is directed to providing, in an ignition control apparatus for internal combustion engine to be driving-controlled without being supplied with electric power from a battery, an ignition control apparatus for internal combustion engine capable of appropriately controlling an ignition timing of an internal combustion engine to prevent an engine from reversely rotating by obtaining a rotational speed of the engine at the earliest possible stage after the engine starts to rotate.

To solve the above-described problems, an ignition control apparatus for internal combustion engine according to the present invention is an ignition control apparatus for internal combustion engine including a rotational speed calculation unit that calculates a rotational speed of an alternating current generator a rotor of which is driven to rotate in synchronization with reciprocating motion of a piston of an internal combustion engine, an ignition timing determination unit that determines an ignition timing of the internal combustion engine based on the rotational speed calculated by the rotational speed calculation unit, and an ignition control unit that supplies electric power to an ignition coil such that the internal combustion engine is ignited at the timing determined by the ignition timing determination unit, characterized in that the rotational speed calculation unit calculates a rotational speed of the rotor based on a polarity signal representing a polarity of an alternating current output voltage corresponding to at least one phase of the alternating current generator and a rotation signal indicating that the rotor of the alternating current generator has passed through a predetermined rotational position when the internal combustion engine is started up.

According to this aspect, in the ignition control apparatus for internal combustion engine, a rotational speed of an engine can be obtained at the earliest possible stage after the engine starts to rotate. Accordingly, an ignition operation at an appropriate advance angle timing can be performed by grasping an accurate rotational speed in an earlier rotation stage even in the internal combustion engine to be driving-controlled without being supplied with electric power from a battery. If the ignition operation can be successfully controlled at the appropriate advance angle timing, the engine does not reversely rotate. As a result, the engine can be prevented from reversely rotating while implementing an improvement in startability. In an internal combustion engine to be supplied with electric power from a battery, a similar effect is also produced because an ignition operation at an appropriate advance angle timing can also be performed from a time point where a first rotation signal has been detected.

In the ignition control apparatus for internal combustion engine, the polarity signal includes a predetermined number of binary continuous pulses generated per rotation of the rotor based on a change in polarity of the alternating current output voltage a period of which varies depending on the rotational speed of the rotor, the rotation signal includes a set of positive and negative single pulses to be generated every time the rotor passes through a predetermined rotational position, and the rotational speed calculation unit can calculate a time period $\Delta t$ obtained by subtracting from a detection time of the single pulse first identifiable in the rotation signal a detection time of the continuous pulse identified in the polarity signal immediately before the single pulse has been identified, and calculate a rotational speed v of the rotor using the time period $\Delta t$ and a predetermined rotation phase $\omega$.

According to this aspect, the rotational speed of the rotor can be calculated based on a time period required to rotate by a predetermined angle (rotation phase) and the rotation phase. The rotational speed of the rotor can be calculated by dividing the predetermined rotation phase $\omega$ by a time period required until the rotor rotates from a rotational position where the continuous pulse identified in the polarity signal immediately before the single pulse has been identified is detected to a rotational position where the single pulse first identifiable in the rotation signal is detected.

In the ignition control apparatus for internal combustion engine, the rotational speed calculation unit calculates the rotational speed of the rotor based on only the rotation signal after the internal combustion engine is started up.

According to this aspect, the ignition control apparatus is switched to normal ignition timing control after the internal combustion engine is started up. Thus, the engine can be prevented from reversely rotating in a simple configuration.

To solve the above-described problems, a control system for internal combustion engine according to the present invention is a control system for internal combustion engine including an alternating current generator that generates an alternating current output voltage when a rotor of the alternating current generator is driven to rotate, a regulator that receives the alternating current output voltage generated by the alternating current generator and converts the alternating current output voltage into a direct current output voltage, a pulser provided at a predetermined rotational position where the rotation of the rotor can be identified, and the ignition control apparatus for internal combustion engine described in any one of the foregoing aspects, characterized in that the regulator includes a polarity signal generation unit that generates a polarity signal including a binary continuous pulse having values each corresponding to a polarity of the alternating current output voltage corresponding to at least one of phases of the alternating current generator.

According to this aspect, the regulator is provided with means for generating a polarity signal. Thus, the alternating current output voltage generated by the alternating current generator need not be inputted to the ignition control apparatus for internal combustion engine.

The control system for internal combustion engine is characterized in that the rotor includes a protrusion provided on a circumference of the rotor, and the pulser includes a pickup coil that generates an electromotive force when the protrusion of the rotor passes by the pickup coil.

According to this aspect, a rotation signal can be generated using a configuration used for normal ignition timing control.

DETAILED DESCRIPTION

An internal combustion engine is driven by igniting compressed mixture gas sucked into a cylinder using a spark plug to cause an explosion. Usually, an ignition timing of the spark plug is controlled by an ignition control apparatus for internal combustion engine such that the spark plug is ignited at a time point where a piston is slightly ahead of a top dead center. The spark plug is ignited at this timing, to prevent an engine from reversely rotating.

An ignition control apparatus 40 for internal combustion engine (see FIG. 1) described in the present specification includes a rotational speed calculation unit 41 that calculates a rotational speed of an internal combustion engine to be driving-controlled without being supplied with electric power from a battery, an ignition timing determination unit 42 that determines an ignition timing based on the rotational speed calculated by the rotational speed calculation unit 41, and an ignition control unit 43 that supplies electric power to an ignition coil 50 such that the internal combustion engine is ignited at the timing determined by the ignition timing determination unit 42. The rotational speed calculation unit 41 calculates, based on a polarity signal representing a polarity of an alternating current output voltage corresponding to at least one of phases of an alternating current generator (ACG) 10 a rotor of which has been driven to rotate in synchronization of reciprocating motion of a piston of the internal combustion engine and a rotation signal indicating that the rotor of the alternating current generator 10 has passed through a predetermined rotational position, a rotational speed of the rotor and determines the ignition timing of the internal combustion engine based on the calculated rotational speed when the internal combustion engine is started up.

Figure 1:
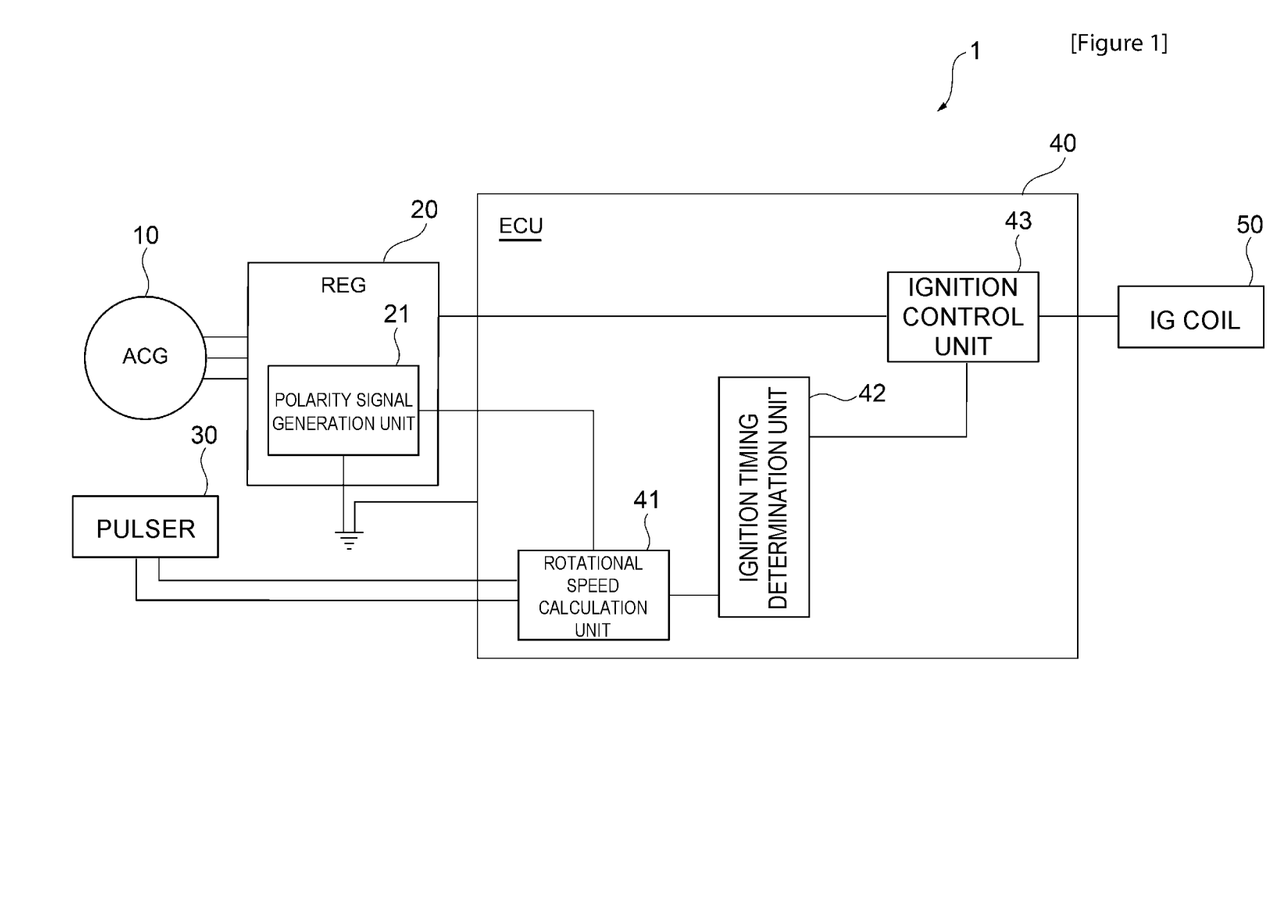
FIG. 1 is a diagram illustrating a schematic configuration of a control system including an ignition control apparatus for internal combustion engine according to a first embodiment.

The above-described polarity signal includes a binary continuous pulse having values each corresponding to the polarity of the alternating current output voltage a period of which varies depending on the rotational speed of the rotor. As the binary continuous pulse included in the polarity signal, a predetermined number of binary continuous pulses are generated per rotation of the rotor. The above-described rotation signal includes a set of positive and negative single pulses to be generated every time the rotor passes through the predetermined rotational position.

The rotational speed calculation unit 41 calculates a time period $\Delta t$ obtained by subtracting from a detection time of the single pulse first identifiable in the rotation signal a detection time of the continuous pulse identified in the polarity signal immediately before the single pulse has been identified, and calculates a rotational speed v of the rotor using the time period $\Delta t$ and a predetermined rotation phase $\omega$ when the internal combustion engine is started up.

The rotational speed calculation unit 41 can determine the ignition timing of the internal combustion engine based on only the rotation signal at a timing of the single pulse in the internal combustion engine later than the first time after a microcomputer is started up.

A control system for internal combustion engine (see FIG. 1) described in the present specification includes the alternating current generator 10, a regulator 20, a pulser 30, and the ignition control apparatus 40. The alternating current generator 10 generates an alternating current output voltage when the rotor is driven to rotate. The regulator 20 receives the alternating current output voltage generated by the alternating current generator 10, and converts the alternating current output voltage into a direct current output voltage. The pulser 30 is provided at a predetermined rotational position where the rotation of the rotor is identifiable. The regulator 20 includes a polarity signal generation unit 21. The polarity signal generation unit 21 generates a polarity signal including a binary continuous pulse having values each corresponding to the polarity of the alternating current output voltage corresponding to at least one of the phases.

The rotor of the alternating current generator 10 includes a protrusion provided on the circumference of the rotor, and the pulser 30 includes a pickup coil that generates an electromotive force when the protrusion in the rotor of the alternating current generator 10 has passed through the predetermined rotational position.

An embodiment of the above-described ignition control apparatus for internal combustion engine will be described in detail below.

First Embodiment

FIG. 1 is a diagram illustrating a schematic configuration of a control system 1 including the ignition control apparatus 40 for internal combustion engine according to a first embodiment. The control system 1 for internal combustion engine includes the alternating current generator 10, the regulator (REG) 20, the pulser 30, the ignition control apparatus (ECU (engine control unit)) 40, and the ignition coil (IG coil) 50, as illustrated in FIG. 1.

As the alternating current generator 10, a single-phase or three-phase alternating current generator including a rotor and a stator can be used. An example in which the three-phase alternating current generator 10 is used is illustrated in FIG. 1. A piston of the internal combustion engine is connected to the rotor via a crank shaft. Reciprocating motion of the piston of the internal combustion engine is converted into rotational motion by the crank shaft and the rotational motion is transferred to the rotor so that rotation of the rotor is synchronized with the reciprocating motion of the piston. The stator is formed by winding a coil around an iron core, and the rotor is formed by alternately arranging magnets respectively having different polarities. The alternating current generator 10 outputs an alternating current output voltage to be generated in the coil of the stator when the rotor rotates relative to the stator.

Here, the alternating current output voltage represents a sine waveform (also referred to as an alternating current waveform) in each of phases of the alternating current generator 10. The alternating current waveform has a period determined depending on an arrangement of the rotor and the stator. The number of alternating current waveforms occurring per rotation of the rotor is previously determined depending on the arrangement of the rotor and the stator. In other words, it can be said that a rotational position of the rotor can be estimated by observing the alternating current waveforms.

In the alternating current generator 10, a protrusion (also referred to as a reluctor) is provided on the circumference of the rotor such that it can be identified that the rotor has passed through a predetermined rotational position. Here, the circumference of the rotor is a concept including the inner periphery and the outer periphery of the rotor. The protrusion may be provided on the inner periphery of the rotor or may be provided on the outer periphery of the rotor.

The regulator 20 receives the alternating current output voltage outputted from the alternating current generator 10, and converts the inputted alternating current output voltage into a direct current output voltage and outputs the direct current output voltage. In the three-phase alternating current generator, the alternating current output voltage to be inputted from each of the phases represent the alternating current waveform, and the phases shift from one another by one-third of one period. The regulator 20 can convert the alternating current output voltage into the direct current output voltage and outputs the direct current output voltage by outputting the highest phase voltage in the alternating current output voltage corresponding to the three phases.

The regulator 20 includes the polarity signal generation unit 21 that generates a polarity signal including a binary continuous pulse having values each corresponding to the polarity of the alternating current output voltage corresponding to at least one of the phases.

As the polarity signal generation unit 21, a microcomputer that receives a value of the alternating current output voltage corresponding to at least one of the three phases can be used. The polarity signal generation unit 21 can generate a binary continuous pulse by outputting a first value when a phase voltage of predetermined one of the three phases has a positive value and outputting a second value when the phase voltage has a negative value. The polarity signal generation unit 21 may output the first value when respective values of not only the phase voltage of the predetermined one phase but also the respective phase voltages of the predetermined two phases or the respective phase voltages of the three phases satisfy a predetermined condition, and may output the second value when the values do not satisfy the predetermined condition.

Here, a polarity signal including a binary continuous pulse will be described. Each of respective values of the binary continuous pulse corresponds to a polarity of an alternating current output voltage. A leading edge and a trailing edge of each of pulses forming the binary continuous pulse respectively correspond to timings at which the polarity changes in the alternating current output voltage. It can be said that a rotational position of the rotor can be estimated by observing a waveform of the alternating current output voltage. Thus, it can be said that from the polarity signal including the binary continuous pulse corresponding to the timings at which the polarity changes in the alternating current output voltage, the rotational position of the rotor can be estimated to some extent. Accordingly, it can be said that rotational positions of the rotor when the binary continuous pulse is generated in the polarity signal are physically determined.

The pulser 30 includes a pickup coil arranged to generate an electromotive force when the rotor of the alternating current generator 10 has passed through the predetermined rotational position, and both ends of the pickup coil are connected to the ignition control apparatus 40 such that a voltage by the electromotive force generated in the pickup coil is outputted as a rotation signal to the ignition control apparatus 40. The electromotive force is generated in the pickup coil when the protrusion provided on the circumference of the rotor of the alternating current generator 10 has passed by the pickup coil of the pulser 30, and a voltage generated as a result of that is inputted to the ignition control apparatus 40 so that it can be detected that the rotor of the alternating current generator 10 has passed through the predetermined rotational position. For example, a positive single pulse waveform is produced in the voltage to be inputted to the ignition control apparatus 40 when a distal end portion in a circumferential direction of the protrusion has reached a position opposing the pickup coil, and a negative single pulse waveform is produced in the voltage to be inputted to the ignition control apparatus 40 when a terminating end portion in the circumferential direction of the protrusion has moved out of the position opposing the pickup coil. Accordingly, it can be said that a rotational position of the rotor when the single pulse is generated in the rotation signal is physically determined.

The ignition control apparatus 40 is an apparatus that controls ignition in the internal combustion engine by controlling electric power to be supplied to the ignition coil 50, and includes the rotational speed calculation unit 41, the ignition timing determination unit 42, and the ignition control unit 43. The ignition control apparatus 40 measures an elapsed time period using a microcomputer counter not illustrated. The microcomputer counter is a counter that increments (counts) a count value by one unit for each predetermined time period after the ignition control apparatus 40 is started up. Upon reaching a predetermined count value, the microcomputer counter starts counting from the beginning again.

The rotational speed calculation unit 41 detects the single pulse included in the rotation signal to be outputted from the pulser 30 and calculates the rotational speed of the rotor, to pass the rotational speed to the ignition timing determination unit 42. The rotational speed calculation unit 41 calculates the rotational speed of the rotor based on the polarity signal including the binary continuous pulse outputted from the polarity signal generation unit 21 and the rotation signal including the single pulse outputted from the pulser 30 when the internal combustion engine is started up. The rotational speed calculation unit 41 calculates the rotational speed of the rotor based on only the rotation signal including the single pulse outputted from the pulser 30 after the internal combustion engine is started up.

The rotational speed calculation unit 41 calculates a time period $\Delta t$ obtained by subtracting from a detection time of the single pulse first identifiable in the rotation signal a detection time of the continuous pulse identified in the polarity signal immediately before the single pulse has been identified, and calculates a rotational speed v of the rotor using the time period $\Delta t$ and a predetermined rotation phase $\omega$ when the internal combustion engine is started up.

The number of continuous pulses included in the polarity signal to be generated while the rotor rotates once is previously determined. Thus, it can be said that respective timings of a leading edge and a trailing edge of each of the continuous pulses in the polarity signal correspond to some of rotational positions in the rotor. It can be said that a detection timing of the single pulse in the rotation signal corresponds to a specific rotational position in the rotor. That is, a phase (angle) in which the rotor rotates until the single pulse in the rotation signal is detected after the leading edge of the continuous pulse in the polarity signal is detected is determined. A value thus determined is set to the predetermined rotation phase $\omega$. The rotational speed v of the rotor can be calculated using the predetermined rotation phase $\omega$ and the time period $\Delta t$ required for the rotation. The predetermined rotation phase $\omega$ is a value determined depending on a configuration of the alternating current generator 10 and an arrangement position of the pulser 30.

In control of the internal combustion engine, the rotational speed is represented using r/min representing the number of rotations per minute as a unit. One minute is 60 sec=60000 msec. Thus, the rotational speed v when a time period required for the rotation in the predetermined rotation phase $\omega$ is $\Delta t$ can be calculated by $v=60000/(\Delta t \times 360/\omega)$.

The ignition timing determination unit 42 determines an ignition timing of the internal combustion engine based on the rotational speed of the rotor calculated in the rotational speed calculation unit 41. The ignition timing determination unit 42 can determine an ignition timing corresponding to the calculated rotational speed and a throttle opening by referring to a 3D table for determining an ignition timing, for example. The ignition timing determination unit 42 gives an ignition permission to the ignition control unit 43 to perform ignition at the determined ignition timing.

The direct current output voltage to be outputted from the regulator 20 is inputted to the ignition control unit 43. The ignition control unit 43 supplies electric power at a predetermined timing toward the primary coil side of the ignition coil based on the ignition permission from the ignition timing determination unit 42 such that ignition is performed in the ignition coil at the ignition timing determined in the ignition timing determination unit 42.

Figure 2:
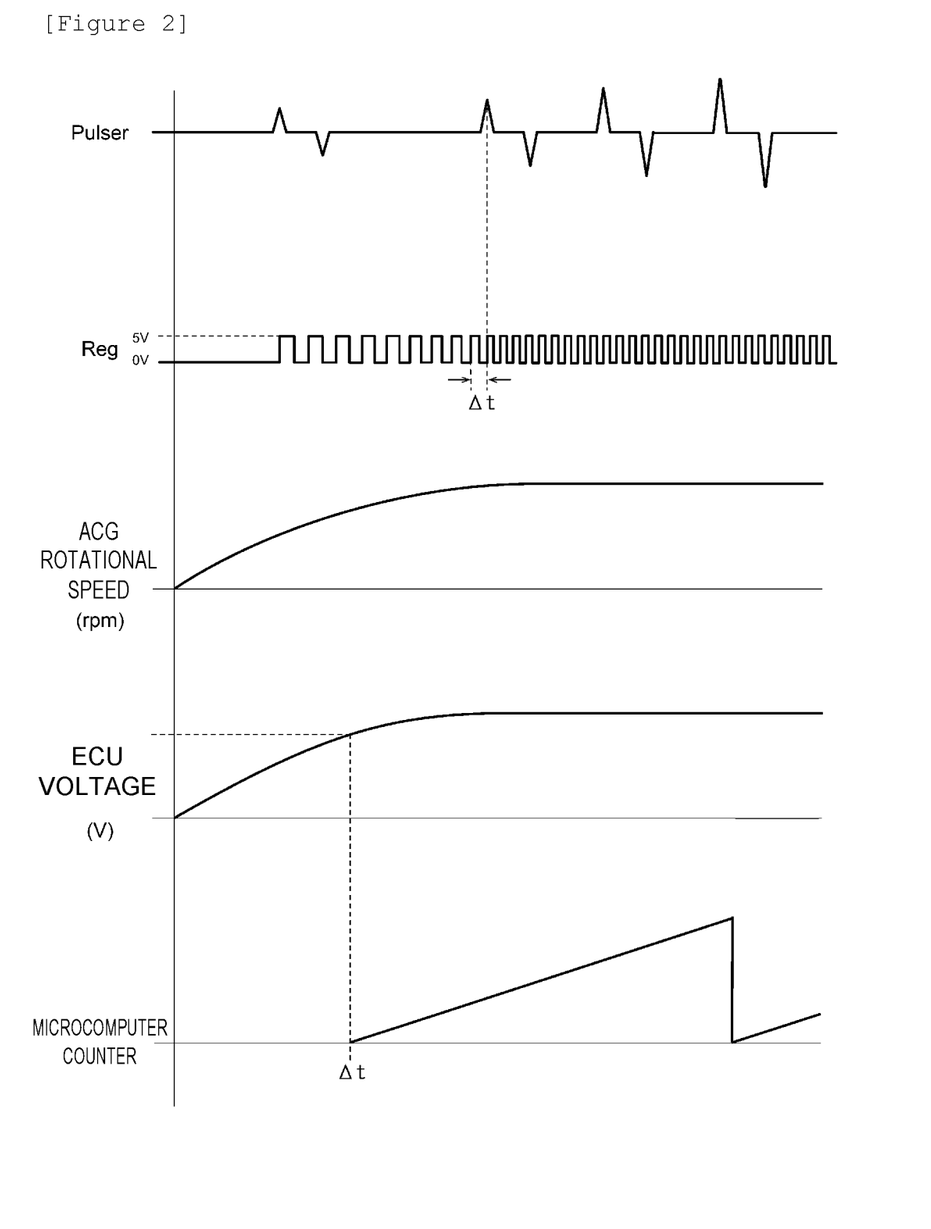
FIG. 2 illustrates a signal waveform representing an operation state of each component in the ignition control apparatus for internal combustion engine according to the first embodiment.

FIG. 2 illustrates a signal waveform representing an operation state of each component in the ignition control apparatus for internal combustion engine according to the first embodiment. Here, calculation of a rotational speed in the ignition timing determination unit 42 when the internal combustion engine is started up will be described.

FIG. 2 illustrates a rotation signal (Pulser) to be outputted from the pulser 30, a polarity signal (Reg) to be outputted from the regulator 20, a rotational speed of the rotor of the alternating current generator 10 (ACG rotational speed), a voltage of the ignition control apparatus 40 (ECU voltage), and a count value of the microcomputer counter in the ignition control apparatus 40 (microcomputer counter).

As illustrated in FIG. 2, in the control system 1 for internal combustion engine, a rotational force is applied to the rotor of the alternating current generator 10 by manual engine startup means such as a recoil-start so that the rotational speed of the rotor of the alternating current generator 10 rises. When the rotational speed of the rotor of the alternating current generator 10 rises, an alternating current output voltage to be outputted from the alternating current generator 10 increases so that electric power to be supplied to each of the units by the regulator 20 rises. When the electric power to be supplied to each of the units by the regulator 20 rises, the polarity signal generation unit 21 in the regulator 20 is started up, and the ignition control apparatus 40 is further started up.

FIG. 2 indicates that the polarity signal generation unit 21 in the regulator 20 rises so that the polarity signal (Reg) starts to be generated when the rotational speed of the rotor rises to a certain value and the voltage of the ignition control apparatus 40 (ECU voltage) rises to a value at which the microcomputer is started up so that the microcomputer starts counting (microcomputer counter) when the rotational speed of the rotor rises.

The rotational speed calculation unit 41 calculates a time period $\Delta t$ obtained by subtracting from a detection time of a single pulse first identifiable in the rotation signal to be outputted from the pulser 30 a detection time of a continuous pulse identified in the polarity signal immediately before the single pulse has been identified, and calculates a rotational speed v of the internal combustion engine using the time period Δt and a predetermined rotation phase ω.

More specifically, a difference time period Δt between a time when a first single pulse is a peak in the rotation signal (Pulser) after the microcomputer counter starts counting and a time of a leading edge of a continuous pulse generated in the polarity signal (Reg) immediately before the single pulse is calculated, and a rotational speed v is calculated using a rotational speed v=60000/(Δt×360/co) using the difference time period Δt and a predetermined rotation phase ω of the rotor during the difference time period Δt.

Here, it can be said that a rotational position of the rotor when the single pulse is generated in the rotation signal is physically determined. The polarity signal includes a binary continuous pulse corresponding to the rotational position of the rotor. The polarity signal includes a plurality of continuous pulses to be generated while the rotor rotates once. Thus, the pulses respectively correspond to a plurality of rotational positions of the rotor. Accordingly, the rotational position of the rotor cannot be estimated.

However, the rotational position of the rotor can be estimated if immediately before the reluctor passes through the pickup coil of the pulser 30. Accordingly, a rotation phase from the rotational position of the rotor when the single pulse is detected to the rotational position corresponding to the immediately preceding continuous pulse can be used to calculate the rotational speed as the predetermined rotation phase ω. This can be said to be because a relationship between a timing at which the rotation signal from the pulser 30 is recognized and an edge of the pulse from the regulator (a physical relationship between configurations to be their respective causes) is known.

Figure 3:
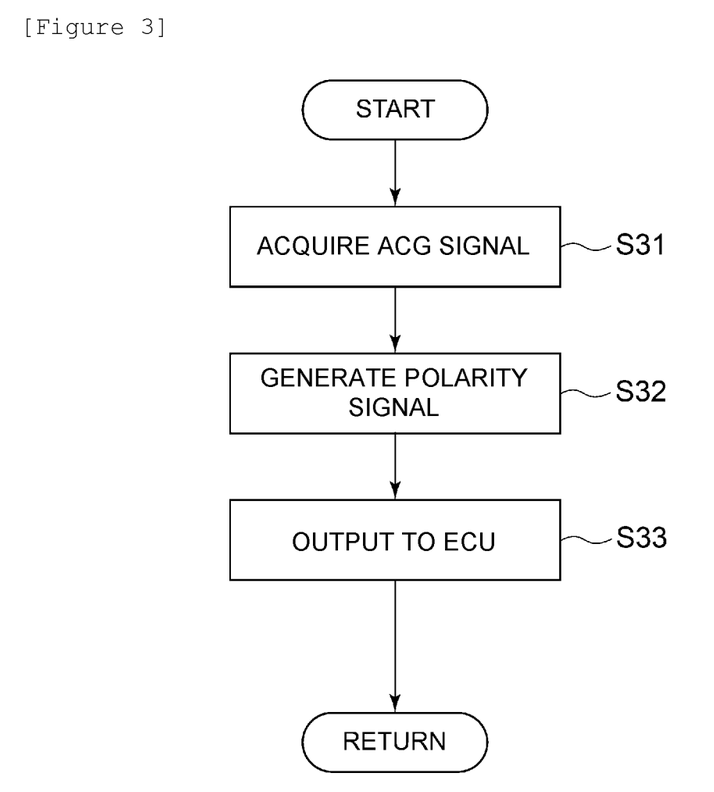
FIG. 3 is a processing flow diagram illustrating an operation of a polarity signal generation unit according to the first embodiment.

Thereafter, processing for determining an ignition timing at the time of startup of the engine in the ignition control apparatus for internal combustion engine according to the first embodiment will be described. FIG. 3 is a processing flow diagram illustrating an operation of the polarity signal generation unit 21 in the regulator 20 according to the first embodiment, and FIG. 4 is a processing flow diagram illustrating respective operations of the rotational speed calculation unit 41 and the ignition timing determination unit 42 in the ignition control apparatus for internal combustion engine according to the first embodiment.

First, when generated electric power reaches a predetermined value or more because a rotational force is applied to the alternating current generator 10 through an engine startup operation, the microcomputer forming the polarity signal generation unit 21 is started up. When the microcomputer forming the polarity signal generation unit 21 is started up, a processing flow illustrated in FIG. 3 is executed by the polarity signal generation unit 21. That is, the polarity signal generation unit 21 acquires an alternating current output voltage corresponding to at least one of phases generated by the alternating current generator 10 (S31), and generates a signal of 5 volts when the acquired alternating current output voltage has a positive value and generates a signal of 0 volts to generate a polarity signal when the alternating current output voltage does not have a positive value (has a negative value) (S32). The polarity signal generation unit 21 outputs the generated polarity signal to the rotational speed calculation unit 41 in the ignition control apparatus 40 (S33).

Figure 4:
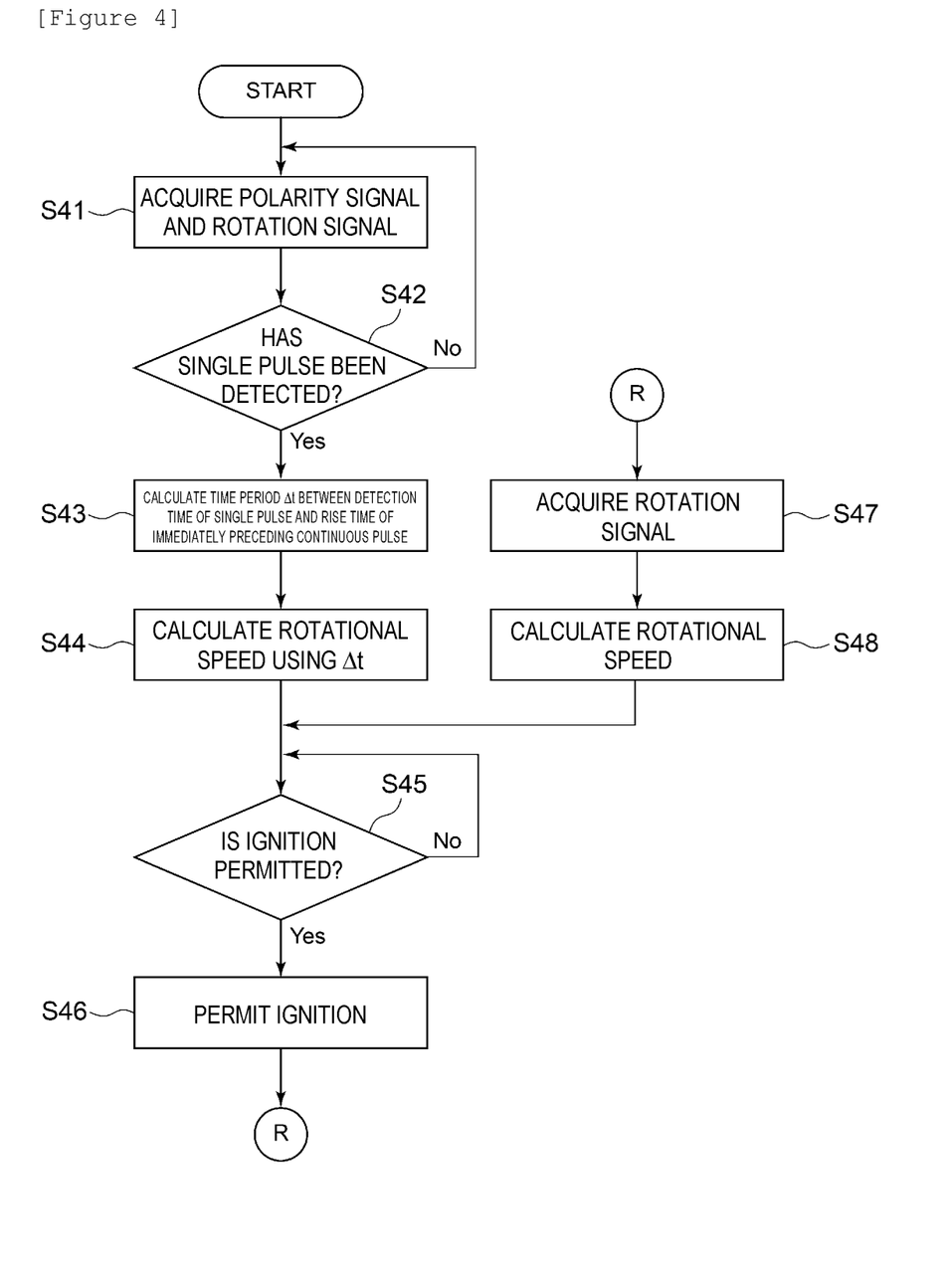
FIG. 4 is a processing flow diagram illustrating an operation of an ignition timing determination unit in the ignition control apparatus for internal combustion engine according to the first embodiment.

When the generated electric power reaches the predetermined value or more because the rotational force is applied to the alternating current generator 10 through the engine startup operation, the microcomputer forming the ignition control apparatus 40 is also started up, and a processing flow illustrated in FIG. 4 is also executed. The rotational speed calculation unit 41 acquires the polarity signal generated by the polarity signal generation unit 21 in the regulator 20 and a rotation signal generated by the pulser 30 (S41).

The rotational speed calculation unit 41 calculates, when judging that a positive single pulse to be generated when a front end of the reluctor has been passed through in the rotation signal has been detected (S42: Yes), a difference time period Δt between a time when the single pulse is detected and a rise time of a continuous pulse in the polarity signal detected immediately before the time (S43), and calculates a rotational speed v using the difference time period Δt (S44). The calculated rotational speed is outputted to the ignition timing determination unit 42.

The ignition timing determination unit 42 determines whether or not a timing is appropriate to ignite the internal combustion engine at a predetermined ignition timing, to determine whether or not the ignition is permitted (S45). If it is determined that the ignition is permitted (S45: Yes), an ignition permission signal is outputted to the ignition control unit 43 (S46). The ignition control unit 43 performs ignition control in the ignition coil 50 upon receiving the ignition permission signal from the ignition timing determination unit 42 so that the internal combustion engine is ignited and the engine is started up.

The rotational speed calculation unit 41 calculates a rotational speed based on only the rotation signal after the engine is started up. That is, the rotational speed calculation unit 41 acquires the rotation signal (S47), and calculates the rotational speed based on the acquired rotation signal and a rotation signal acquired last time (S48). The rotation signal herein referred to can be calculated as 27t/Δt (rpm) by calculating a time period Δt between a time when a peak of a positive single pulse has been detected and a time when a peak of an immediately preceding positive single pulse has been detected when the rotational speed is calculated using a peak of a positive single pulse generated two times per rotation as a reference.

As processing after the rotational speed is calculated in the rotational speed calculation unit 41 (S48), the ignition timing determination unit 42 determines whether or not ignition is permitted (S45) and outputs an ignition permission signal (S46), like when the engine is started up.

Therefore, according to the ignition control apparatus for internal combustion engine according to the present embodiment, the engine can be prevented from reversely rotating by obtaining the rotational speed of the engine at the earliest possible stage at the time of startup of the engine to appropriately control the ignition timing.

Note that in the above-described embodiment, the rotational speed calculation unit 41 calculates the time period Δt obtained by subtracting from the detection time of the single pulse first identifiable in the rotation signal the detection time of the continuous pulse identified in the polarity signal immediately before the single pulse has been identified, and calculates the rotational speed v of the rotor using the time period Δt and the predetermined rotation phase ω when the internal combustion engine is started up. However, the present invention is not limited to the present embodiment, but a time period Δt obtained by subtracting from the detection time of the single pulse first identifiable in the rotation signal a detection time of the continuous pulse identified in the polarity signal "earlier than a time immediately before" the single pulse is identified. In this case, the predetermined rotation phase ω can be changed to correspond to a detection position of the polarity signal.

1 control system for internal combustion engine, 10 alternating current generator, 20 regulator (REG), 30 pulser, 40 ignition control apparatus (ECU), 41 rotational speed calculation unit, 42 ignition timing determination unit, 43 ignition control unit, 50 ignition coil (IG coil)

The invention claimed is:

1. An ignition control apparatus, comprising:
a rotational speed calculator that calculates a rotational speed of a rotor of an alternating current generator, the rotor of the alternating current generator being driven to rotate in synchronization with reciprocating motion of a piston of an internal combustion engine;
an ignition timing determiner that determines an ignition timing of the internal combustion engine based on the rotational speed calculated by the rotational speed calculator; and
an ignition controller that supplies electric power to an ignition coil such that the internal combustion engine is ignited at the timing determined by the ignition timing determiner;
wherein the rotational speed calculator calculates the rotational speed of the rotor based on a polarity signal provided by a regulator representing a polarity of an alternating current output voltage corresponding to at least one phase of the alternating current generator and a rotation signal provided by a pulser indicating that the rotor of the alternating current generator has passed through a predetermined rotational position when the internal combustion engine is started up;
wherein the polarity signal includes a predetermined number of binary continuous pulses generated per rotation of the rotor based on a change in polarity of the alternating current output voltage, a period of which varies depending on the rotational speed of the rotor, and the rotation signal includes a set of positive and negative single pulses to be generated when the rotor passes through a predetermined rotational position; and
wherein the rotational speed calculator calculates a time period obtained by subtracting from a detection time of the single pulse first identifiable in the rotation signal a detection time of the continuous pulse identified in the polarity signal immediately before the single pulse has been identified, and calculates a rotational speed of the internal combustion engine using the time period and a predetermined rotation phase.

2. The ignition control apparatus according to claim 1, wherein the rotational speed calculator calculates the rotational speed of the rotor based on the rotation signal only after the internal combustion engine is started up.

3. The ignition control apparatus according to claim 1, wherein the time period is a difference time period between a time when a first single pulse is a peak in the rotation signal after a counter of the ignition control apparatus starts counting and a time of a leading edge of a continuous pulse in the polarity signal immediately before the first single pulse is detected, and wherein the rotational speed is calculated using the difference time period and the predetermined rotation phase of the rotor during the difference time period.

4. A control system comprising:
an alternating current generator that generates an alternating current output voltage when a rotor of the alternating current generator is driven to rotate;
a regulator that receives the alternating current output voltage generated by the alternating current generator and converts the alternating current output voltage into a direct current output voltage;
a pulser provided at a predetermined rotational position where the rotation of the rotor can be identified; and
an ignition control apparatus, the ignition control apparatus including:
a rotational speed calculator that calculates a rotational speed of the rotor of the alternating current generator, the rotor of the alternating current generator being driven to rotate in synchronization with reciprocating motion of a piston of an internal combustion engine;
an ignition timing determiner that determines an ignition timing of the internal combustion engine based on the rotational speed calculated by the rotational speed calculator;
an ignition controller that supplies electric power to an ignition coil such that the internal combustion engine is ignited at the timing determined by the ignition timing determiner,
wherein the rotational speed calculator calculates the rotational speed of the rotor based on a polarity signal provided by the regulator representing a polarity of an alternating current output voltage corresponding to at least one phase of the alternating current generator and a rotation signal provided by the pulser indicating that the rotor of the alternating current generator has passed through a predetermined rotational position when the internal combustion engine is started up;
wherein the polarity signal includes a predetermined number of binary continuous pulses generated per rotation of the rotor based on a change in polarity of the alternating current output voltage, a period of which varies depending on the rotational speed of the rotor, and the rotation signal includes a set of positive and negative single pulses to be generated when the rotor passes through a predetermined rotational position;
wherein the rotational speed calculator calculates a time period obtained by subtracting from a detection time of the single pulse first identifiable in the rotation signal a detection time of the continuous pulse identified in the polarity signal immediately before the single pulse has been identified, and calculates a rotational speed of the internal combustion engine using the time period and a predetermined rotation phase; and
wherein the regulator includes a polarity signal generator that generates the polarity signal including a binary continuous pulse having values each corresponding to the polarity of the alternating current output voltage corresponding to at least one of phases of the alternating current generator.

5. The control system according to claim 4, wherein:
the rotor includes a protrusion provided on a circumference of the rotor, and
the pulser includes a pickup coil that generates an electromotive force when the protrusion of the rotor has passed through the predetermined rotational position.

6. The control system according to claim 5, wherein both ends of the pickup coil are connected to the ignition control apparatus such that a voltage of the electromagnetic force generated in the pickup coil is outputted as the rotation signal.

7. The control system according to claim 5, wherein the regulator includes a microcomputer as the polarity signal generator.

8. The control system according to claim 4, wherein the rotational speed calculator calculates the rotational speed of the rotor based on the rotation signal only after the internal combustion engine is started up.

9. An internal combustion engine, comprising:
an alternating current generator that generates an alternating current output voltage when a rotor of the alternating current generator is driven to rotate;
an ignition control apparatus, the ignition control apparatus including:
  a rotational speed calculator that calculates a rotational speed of the rotor of the alternating current generator, the rotor of the alternating current generator being driven to rotate in synchronization with reciprocating motion of a piston of the internal combustion engine;
  an ignition timing determiner that determines an ignition timing of the internal combustion engine based on the rotational speed calculated by the rotational speed calculator; and
  an ignition controller that supplies electric power to an ignition coil such that the internal combustion engine is ignited at the timing determined by the ignition timing determiner;
  wherein the rotational speed calculator calculates the rotational speed of the rotor based on a polarity signal representing a polarity of an alternating current output voltage corresponding to at least one phase of the alternating current generator and a rotation signal indicating that the rotor of the alternating current generator has passed through a predetermined rotational position when the internal combustion engine is started up;
  wherein the polarity signal includes a predetermined number of binary continuous pulses generated per rotation of the rotor based on a change in polarity of the alternating current output voltage, a period of which varies depending on the rotational speed of the rotor, and the rotation signal includes a set of positive and negative single pulses to be generated when the rotor passes through a predetermined rotational position;
  wherein the rotational speed calculator calculates a time period obtained by subtracting from a detection time of the single pulse first identifiable in the rotation signal a detection time of the continuous pulse identified in the polarity signal immediately before the single pulse has been identified, and calculates a rotational speed of the internal combustion engine using the time period and a predetermined rotation phase; and
  wherein the rotational speed calculator calculates the rotational speed of the rotor based on the rotation signal only after the internal combustion engine is started up.

10. The internal combustion engine according to claim 9, further comprising:
a regulator that receives the alternating current output voltage generated by the alternating current generator and converts the alternating current output voltage into a direct current output voltage; and
a pulser provided at a predetermined rotational position where the rotation of the rotor can be identified;
wherein the regulator includes a polarity signal generation unit that generates the polarity signal including a binary continuous pulse having values each corresponding to the polarity of the alternating current output voltage corresponding to at least one of phases of the alternating current generator.

11. The internal combustion engine according to claim 10, wherein:
the rotor includes a protrusion provided on a circumference of the rotor; and
the pulser includes a pickup coil that generates an electromotive force when the protrusion of the rotor has passed through the predetermined rotational position.

12. The internal combustion engine according to claim 9, wherein the ignition control apparatus is a microcomputer of an engine control unit (ECU).

13. The internal combustion engine according to claim 9, wherein the time period is a difference time period between a time when a first single pulse is a peak in the rotation signal after a counter of the ignition control apparatus starts counting and a time of a leading edge of a continuous pulse in the polarity signal immediately before the first single pulse is detected, and wherein the rotational speed is calculated using the difference time period and the predetermined rotation phase of the rotor during the difference time period.

* * * * *